United States Patent
Ford et al.

(10) Patent No.: US 11,802,207 B2
(45) Date of Patent: Oct. 31, 2023

(54) MELT EXTRUSION OF HEMP-BASED THERMOPLASTICS

(71) Applicant: North Carolina State University, Raleigh, NC (US)

(72) Inventors: Ericka N. Ford, Raleigh, NC (US); Manik Chandra Biswas, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 17/566,641

(22) Filed: Dec. 30, 2021

(65) Prior Publication Data

US 2022/0204774 A1    Jun. 30, 2022

Related U.S. Application Data

(60) Provisional application No. 63/132,626, filed on Dec. 31, 2020.

(51) Int. Cl.
  *B29B 9/06*    (2006.01)
  *C07G 1/00*    (2011.01)
  (Continued)

(52) U.S. Cl.
  CPC .......... *C08L 97/02* (2013.01); *B29C 69/001* (2013.01); *C08L 67/04* (2013.01); *C08L 97/005* (2013.01);
  (Continued)

(58) Field of Classification Search
  CPC ..... B29B 9/06; B29C 69/001; B29C 2793/00; B29K 2067/003; B29K 2067/043;
  (Continued)

(56) References Cited

U.S. PATENT DOCUMENTS 6,500,373 B1 *  12/2002  Konishi  .............. B29B 17/0412
                                                      264/913 X
2011/0217544 A1    9/2011  Young et al.
                       (Continued)

FOREIGN PATENT DOCUMENTS

CN    104693464 A  *   6/2015   .............. C08L 67/04
CN    105778450 A  *   7/2016   .............. C08L 67/04
                       (Continued)

OTHER PUBLICATIONS

Translation of CN 104693464 A (published on Jun. 10, 2015).*
(Continued)

*Primary Examiner* — Leo B Tentoni
(74) *Attorney, Agent, or Firm* — Jenkins, Taylor & Hunt, P.A.

(57) ABSTRACT

Methods of preparing a lignocellulosic biomass-based thermoplastic composition are described. In some embodiments, the method comprises: (a) preparing a mixture of solids comprising lignocellulosic biomass, a meltable solvent and a polyester; and (b) melt-compounding said mixture of solids; thereby preparing a lignocellulosic biomass-based thermoplastic composition. Fibers produced by the methods are also described, as are yarns and fabrics comprising the fibers.

22 Claims, 10 Drawing Sheets
(6 of 10 Drawing Sheet(s) Filed in Color)

(51) Int. Cl.
| | |
|---|---|
| *C08G 63/16* | (2006.01) |
| *C08G 63/183* | (2006.01) |
| *C08L 67/02* | (2006.01) |
| *C08L 97/02* | (2006.01) |
| *D01D 5/08* | (2006.01) |
| *D01D 5/12* | (2006.01) |
| *D01F 2/24* | (2006.01) |
| *C08L 67/04* | (2006.01) |
| *D01D 1/04* | (2006.01) |
| *B29C 69/00* | (2006.01) |
| *C08L 97/00* | (2006.01) |
| *B29K 67/00* | (2006.01) |
| *B29K 105/26* | (2006.01) |

(52) U.S. Cl.
CPC .................. *D01D 1/04* (2013.01); *D01D 5/08* (2013.01); *D01D 5/12* (2013.01); *D01F 2/24* (2013.01); *B29C 2793/00* (2013.01); *B29K 2067/003* (2013.01); *B29K 2067/043* (2013.01); *B29K 2067/046* (2013.01); *B29K 2105/26* (2013.01); *C08L 2203/12* (2013.01); *C08L 2207/20* (2013.01)

(58) Field of Classification Search
CPC .......... B29K 2067/046; B29K 2105/26; C07G 1/00; C08G 63/16; C08G 63/183; C08H 6/00; C08L 67/02; C08L 67/04; C08L 97/005; C08L 97/02; D01D 1/04; D01D 5/08; D01D 5/12
USPC .... 264/138, 141, 210.6, 210.8, 330, 331.21, 264/349, 911, 913, 920; 525/437; 527/100, 103, 400; 530/500, 507
See application file for complete search history.

(56) References Cited

U.S. PATENT DOCUMENTS

2013/0224486 A1* 8/2013 Branscomb ......... B29B 17/0026
264/138 X
2021/0388533 A1 12/2021 Ford et al.

FOREIGN PATENT DOCUMENTS

| CN | 104151622 B | 9/2016 |
|---|---|---|
| CN | 108374210 B | 12/2020 |
| WO | WO 2020/073010 A1 | 4/2020 |
| WO | WO 2022/147330 A1 | 7/2022 |

OTHER PUBLICATIONS

Translation of CN 105778450 A (published on Jul. 20, 2016).*
Elhi et al., (2020), "Influence of Carboxylate Anions on Phase Behavior of Choline Ionic Liquid Mixtures," Molecules, 25(7),1691;12 Pages.
International Search Report and Written Opinion for International Application No. PCT/US2021/065793 dated Mar. 22, 2022.
International Preliminary Report on Patentability for International Application No. PCT/US2021/065793 dated Jul. 4, 2023.

* cited by examiner

MELT EXTRUSION OF HEMP-BASED THERMOPLASTICS

CROSS REFERENCE TO RELATED APPLICATIONS

This application claims benefit of and priority to U.S. Provisional Patent Application Ser. No. 63/132,626, filed Dec. 31, 2020, the disclosure of which is incorporated herein by reference in its entirety.

TECHNICAL FIELD

The presently disclosed subject matter relates in some embodiments to methods of preparing fibers and pellets comprising cellulose and a thermoplastic polymer, and to yarns, fabrics, and other articles produced from the fibers and pellets. For example, in some embodiments, the presently disclosed subject matter provides a method of melt-extruding a mixture comprising hemp or another lignocellulosic biomass material, a polyester, and a meltable solvent to provide fibers.

BACKGROUND

Given continuing concerns regarding the availability and environmental impact of products derived from petroleum-based chemicals, the use of cellulose and cellulose-based derivatives obtained from lignocellulosic substances has become increasingly attractive as a substitute in the production of a wide variety of products. Many products based on petroleum-based chemicals cause serious waste material problems because they do not dissolve in nature and can release toxic substances when they are burnt. In contrast, lignocellulosic materials can be recycled after being used without giving harm to the environment. Lignocellulosic materials are also renewable and can be readily sourced from a number of agricultural waste products.

Regenerated cellulose is a term that can be used to refer to materials prepared by converting natural cellulose into a soluble cellulosic material and then converting the soluble cellulosic material into a form such as a fiber or film. Thus, regenerated cellulosic fibers are fibers that have been prepared by regeneration (e.g., return to solid form) from a solution that includes dissolved cellulosic fiber. Rayon, for example, is a type of regenerated cellulosic fiber extensively used in the textile industry to manufacture articles of clothing. Rayon fibers can be produced by the viscose or cuprammonium processes. In the viscose process, cellulose is first steeped in a mercerizing strength caustic soda solution to form an alkali cellulose. This is reacted with carbon disulfide to form cellulose xanthate which is then dissolved in dilute caustic soda solution. After filtration and deaeration, the xanthate solution is extruded from submerged spinnerets into a regenerating bath of sulfuric acid, sodium sulfate, zinc sulfate, and glucose to form continuous filaments. The resulting "viscose rayon" has been used in textiles and was formerly widely used for reinforcing rubber articles, such as tires and drive belts. Cellulose is also soluble in a solution of ammoniacal copper oxide. The resulting cellulose solution can be forced through submerged spinnerets into a solution of 5% caustic soda or dilute sulfuric acid to form the fibers, which are then decoppered and washed to provide cuprammonium rayon.

Both the viscose or cuprammonium processes involve chemical derivatization or complexation of the cellulose to render it soluble and capable of being spun into fibers. The reagents used to solubilize the cellulose are removed following spinning. In addition, carbon disulfide is toxic. Accordingly, additional processes were developed based on efforts to identify solvents capable of dissolving underivatized cellulose to form a dope of underivatized cellulose from which fibers can be spun. In particular, one class of organic solvents useful for dissolving cellulose are the amine-N oxides, in particular the tertiary amine-N oxides (e.g., N-methylmorpholine oxide (NMMO)). Dimethyl acetamide (DMA or DMAc) is another solvent that has been used for dissolving cellulose. Lyocell is a generic term for a fiber composed of cellulose precipitated from an organic solution in which no substitution of hydroxyl groups takes place and no chemical intermediates are formed. Several manufacturers produce lyocell fibers, principally for use in the textile industry. For example, TENCEL™ fiber is a lyocell fiber produced by Lenzing (Lenzing, Austria).

Because the organic solvents used to dissolve cellulose are generally flammable solvents, there is an ongoing need for additional methods of preparing regenerated cellulosic fibers that are safer, e.g., that do not involve the use of flammable solvents and/or that use less toxic chemicals. There is also an ongoing need for new methods of producing cellulosic materials with physical properties that can be tuned for use in different manufacturing processes and/or for different end applications and that incorporate recycled and/or biodegradable materials.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a method of preparing a lignocellulosic biomass-based thermoplastic composition, wherein the method comprises: (a) providing a mixture of solids comprising lignocellulosic biomass, a meltable solvent and a polyester; and (b) melt-compounding said mixture of solids; thereby preparing a lignocellulosic biomass-based thermoplastic composition. In some embodiments, the lignocellulosic biomass comprises hemp, optionally ground hemp. In some embodiments, the meltable solvent comprises one or more of dimethyl sulfone (DMS-2), DMS-2 and lithium chloride, DMS-2 and zinc chloride, choline acetate, choline isobutyrate, choline isovalerate, choline 2-methylbutyrate, and 1-ethyl-3-methylimidazolium acetate, optionally wherein the meltable solvent comprises or consists of DMS-2.

In some embodiments, the polyester comprises a bioplastic polyester, optionally wherein said bioplastic polyester comprises one or more polyester selected from the group comprising polylactic acid (PLA), polyglycolic acid (PGA), poly ε-caprtrolactone (PCL), polyhydroxybutyrate (PHB), poly(3-hydroxy valerate), poly(ethylene succinate) (PESu), poly(propylene succinate) (PPSu), polybutylene succinate (PBSu), poly(ethylene furanoate) (PEF) and poly(1-4, butylene adipate). In some embodiments, the bioplastic polyester comprises or consists of PLA. In some embodiments, the polyester comprises a recycled semi-rigid polyester, optionally recycled polyethylene terephthalate (PET).

In some embodiments, the mixture of solids comprises a weight ratio of lignocellulosic biomass to meltable solvent of about 1:0.1 to about 1:1, optionally wherein the weight ratio is about 1:1. In some embodiments, step (a) comprises: (a1) providing a ground lignocellulosic biomass; (a2) contacting the ground lignocellulosic biomass with the meltable solvent; and (a3) adding the polyester. In some embodiments, the melt-compounding is performed at a temperature of about 170 degrees Celsius (° C.) to about 200° C.

In some embodiments, the melt-compounding comprises melt-spinning or melt-extruding to provide a lignocellulosic biomass-based fiber, optionally wherein the method further comprises drawing the lignocellulosic biomass-based fiber at an elevated temperature after the melt-spinning or melt-extruding, further optionally wherein the elevated temperature is about 130° C. to about 240° C. In some embodiments, the method further comprises chopping the fiber.

In some embodiments, the method further comprises removing meltable solvent from the lignocellulosic biomass-based thermoplastic composition.

In some embodiments, the presently disclosed subject matter provides a lignocellulosic biomass-based thermoplastic composition prepared according to a method comprising: (a) providing a mixture of solids comprising lignocellulosic biomass, a meltable solvent and a polyester; and (b) melt-compounding said mixture of solids. In some embodiments, the lignocellulosic biomass-based thermoplastic composition is a lignocellulosic biomass-based thermoplastic fiber. In some embodiments, the presently disclosed subject matter provides a yarn prepared from the lignocellulosic biomass-based thermoplastic fiber. In some embodiments, the presently disclosed subject matter provides a fabric prepared from the yarn, optionally wherein the fabric is a non-woven fabric.

In some embodiments, the presently disclosed subject matter provides a composition comprising: (i) cellulose; (ii) a polyester; and (iii) a meltable solvent. In some embodiments, the meltable solvent comprises one or more of dimethyl sulfone (DMS-2), DMS-2 and lithium chloride, DMS-2 and zinc chloride, choline acetate, choline isobutyrate, choline isovalerate, choline 2-methylbutyrate, and 1-ethyl-3-methylimidazolium acetate, optionally wherein the meltable solvent comprises or consists of DMS-2. In some embodiments, the polyester comprises a bioplastic polyester, optionally wherein said bioplastic polyester comprises one or more polyester selected from the group comprising polylactic acid (PLA), polyglycolic acid (PGA), poly ε-captrolactone (PCL), polyhydroxybutyrate (PHB), poly(3-hydroxy valerate), poly(ethylene succinate) (PESu), poly (propylene succinate) (PPSu), polybutylene succinate (PBSu), poly(ethylene furanoate) (PEF), and poly(1-4, butylene adipate). In some embodiments, the bioplastic polyester comprises or consists of PLA. In some embodiments, the polyester comprises a recycled semirigid polyester, optionally recycled polyethylene terephthalate (PET).

In some embodiments, the composition comprises a weight ratio of cellulose to meltable solvent of about 1:0.1 to about 1:1, optionally wherein the ratio is about 1:1. In some embodiments, the weight ratio of polyester to cellulose is about 1:1 to about 9:1. In some embodiments, the composition further comprises an antioxidant, optionally lauryl gallate. In some embodiments, the cellulose is from hemp.

In some embodiments, the presently disclosed subject matter provides an article comprising the composition comprising: (i) cellulose; (ii) a polyester; and (iii) a meltable solvent. In some embodiments, the article is a fiber, a yarn, or a fabric. In some embodiments, the article comprises a rod, a pellet, or a molded part.

It is an object of the presently disclosed subject matter to provide methods of preparing lignocellulosic biomass-based thermoplastic compositions and to related compositions, fibers, yarns, fabrics, pellets and articles. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description and Figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
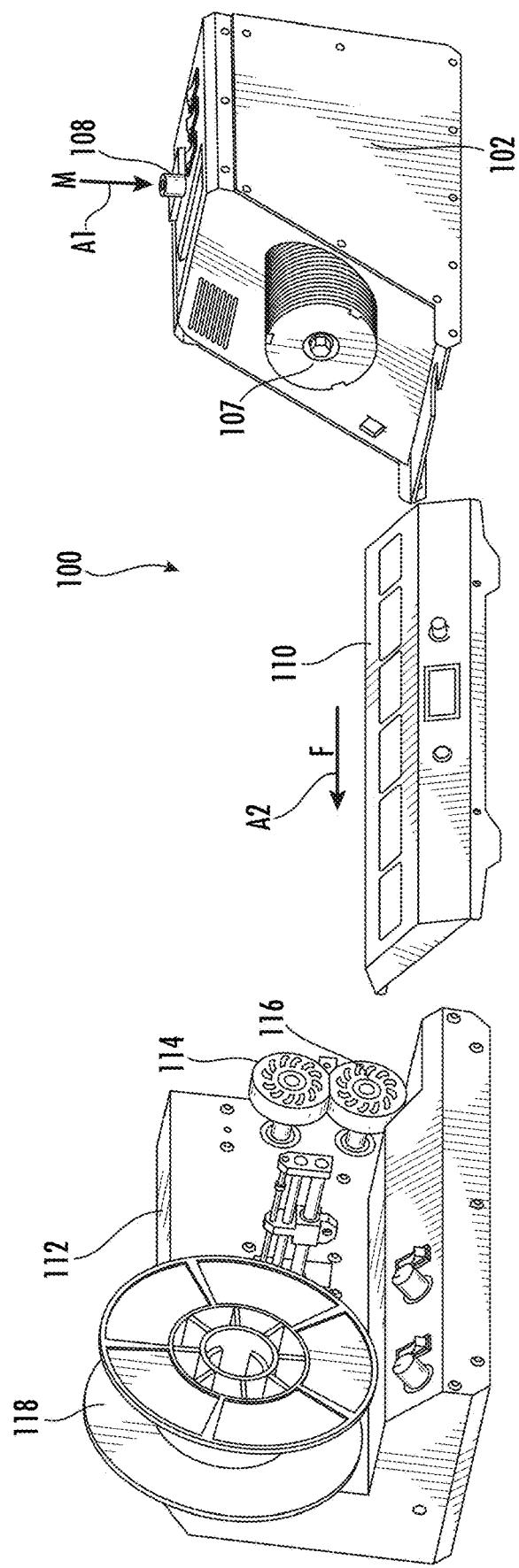
FIG. 1 is a schematic perspective view of a system in accordance with the presently disclosed subject matter suitable for use in carrying out a method of the presently disclosed subject matter.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

I. DEFINITIONS

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the presently disclosed and claimed subject matter.

Following long-standing patent law convention, the terms "a", "an", and "the" refer to "one or more" when used in this application, including in the claims. Thus, as used herein and in the appended claims, the singular forms "a," "an," and "the" include plural referents unless the context clearly dictates otherwise. For example, the phrase "a light source" refers to one or more light sources, including a plurality of the same type of light source. Similarly, the phrase "at least one", when employed herein to refer to an entity, refers to, for example, 1, 2, 3, 4, 5, 6, 7, 8, 9, 10, 15, 20, 25, 30, 35, 40, 45, 50, 75, 100, or more of that entity, including but not limited to whole number values between 1 and 100 and greater than 100. As such, the terms "a", "an", "one or more" and "at least one" can be used interchangeably. Similarly, the terms "comprising", "including" and "having" can be used interchangeably. It is further noted that the claims may be drafted to exclude any optional element. As such, this statement is intended to serve as antecedent basis for use of such exclusive terminology as "solely," "only" and the like, in connection with the recitation of claim elements, or use of a "negative" limitation.

Unless otherwise indicated, all numbers expressing quantities of temperature, time, concentration, length, width, height, and so forth used in the specification and claims are to be understood as being modified in all instances by the term "about". The term "about", as used herein when referring to a measurable value such as an amount of mass, weight, time, volume, length, width, or temperature is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods and/or employ the disclosed subject matter. Accordingly, unless indicated to the contrary, the numerical parameters set forth in this specification and attached claims are approximations that can vary depending upon the desired properties sought to be obtained by the presently disclosed subject matter.

Ranges can be expressed herein as from "about" one particular value, and/or to "about" another particular value. When such a range is expressed, some embodiments includes from the one particular value and/or to the other particular value. Similarly, when values are expressed as approximations, by use of the antecedent "about," it will be understood that the particular value forms an embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" are also disclosed. It is also understood that the throughout the application, data are provided in a number of different formats, and that these data represent in some embodiments endpoints and starting points and in some embodiments ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4).

As used herein, the term "and/or" when used in the context of a list of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including" "containing", or "characterized by", is inclusive or open-ended and does not exclude additional, unrecited elements and/or method steps. "Comprising" is a term of art that means that the named elements and/or steps are present, but that other elements and/or steps can be added and still fall within the scope of the relevant subject matter.

As used herein, the phrase "consisting essentially of" limits the scope of the related disclosure or claim to the specified materials and/or steps, plus those that do not materially affect the basic and novel characteristic(s) of the disclosed and/or claimed subject matter.

As used herein, the phrase "consisting of" excludes any element, step, or ingredient not specifically recited. It is noted that, when the phrase "consists of" appears in a clause of the body of a claim, rather than immediately following the preamble, it limits only the element set forth in that clause; other elements are not excluded from the claim as a whole.

With respect to the terms "comprising", "consisting of", and "consisting essentially of", where one of these three terms is used herein, the presently disclosed and claimed subject matter can include the use of either of the other two terms.

The terms "optional" and "optionally" as used herein indicate that the subsequently described event, circumstance, element, and/or method step may or may not occur and/or be present, and that the description includes instances where said event, circumstance, element, or method step occurs and/or is present as well as instances where it does not.

As used herein, a "monomer" refers to a non-polymeric molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

As used herein the terms "polymer", "polymeric" and "polymeric matrix" refer to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units. A "copolymer" refers to a polymer derived from more than one species of monomer.

The term "thermoplastic" can refer to a polymer that softens and/or can be molded above a certain temperature, but which is solid below that temperature. Thermoplastic polymers include, but are not limited to, ethylene vinyl acetate copolymers (EVA), polyolefins (e.g., polyethylene, polypropylene (PP), polyamides, some polyesters (e.g., polybutylene terephthalate (PBT)), styrene block copolymers (SBCs), polycarbonates, silicone rubbers, fluoropolymers, thermoplastic elastomers, polypyrrole, polycaprolactone, polyoxymethylene (POM), polyethylene oxide (PEO), polypropylene oxide (PPO), and mixtures and/or combinations thereof.

The term "polyester" refers to a polymer or co-polymer comprising a backbone or main chain with linkages of the formula —O—C(=O)—.

As used herein the term "bioplastic polyester" refers to thermoplastic polyesters that can be prepared from renewable sources (e.g. monomers derived from plant matter), which can also be referred to as "biobased polyesters", and/or biodegradable polyesters, which can be biobased or synthetic (e.g., prepared from monomers from petroleum-based materials). Typically, bioplastic polyesters are aliphatic esters. Exemplary biobased polyesters included, but are not limited to, polylactic acid (PLA), which can be isotactic (i.e., poly(L-lactic acid) or poly(D-lactic acid)) or syndiotactic (i.e., poly(D,L-lactic acid); polyglycolic acid (PGA), poly ε-caprolactone (PCL), polyhydroxybutyrate (PHB), and poly(-hydroxy valerate). Biodegradable synthetic bioplastic polyesters include, but are not limited to poly(ethylene succinate) (PESu), poly(propylene succinate (PPSu), and poly(butylene succinate (PBSu).

"Biodegradable" means materials that are broken down or decomposed by natural biological processes. Biodegradable materials can be broken down for example, by cellular machinery, proteins, enzymes, hydrolyzing chemicals or reducing agents present in biological fluids or soil, intracellular constituents, and the like, into components that can be either reused or disposed of without significant toxic effect on the environment. Thus, the term "biodegradable" as used herein refers to both enzymatic and non-enzymatic breakdown or degradation of polymeric structures. In some embodiments, the degradation time is a function of polymer composition and morphology. Suitable degradation times are from hours or days to weeks to years.

The term "saccharide" refers to a carbohydrate monomer, oligomer or larger polymer. Thus, a saccharide can be a compound that includes one or more cyclized monomer unit based upon an open chain form of a compound having the chemical structure $H(CHOH)_nC(=O)(CHOH)_mH$, wherein the sum of n+m is an integer between 2 and 8. Thus, the monomer units can include trioses, tetroses, pentoses, hexoses, heptoses, nonoses, and mixtures thereof. In some embodiments, each cyclized monomer unit is based on a compound having a chemical structure wherein n+m is 4 or 5. Thus, saccharides can include monosaccharides including, but not limited to, aldohexoses, aldopentoses, ketohexoses, and ketopentoses such as arabinose, lyxose, ribose, xylose, ribulose, xylulose, allose, altrose, galactose, glucose, gulose, idose, mannose, talose, fructose, psicose, sorbose, and tagatose, and to hetero- and homopolymers thereof. Saccharides can also include disaccharides including, but not limited to sucrose, maltose, lactose, trehalose, and cellobiose, as well as hetero- and homopolymers thereof.

The term "lignocellulosic" refers to a composition comprising both lignin and cellulose. In some embodiments, lignocellulosic material can comprise hemicellulose, a polysaccharide which can comprise saccharide monomers other than glucose. Typically, lignocellulosic materials comprise between about 30-45 weight % cellulose, about 20-35 weight % hemicellulose; and about 3-35 weight % lignin.

Lignocellulosic biomass include a variety of plants and plant materials, such as, but not limited to, papermaking sludge; wood, and wood-related materials, e.g., saw dust, or particle board, leaves, or trees, such as poplar trees; fibers from wood or non-wood plants; grasses, such as switchgrass and sudangrass; grass clippings; rice hulls; bagasse (e.g., sugar cane bagasse), jute; hemp; flax; kapok, coir, cotton, bamboo; sisal; abaca; hays; straws; miscanthus, corn cobs; corn stover; whole plant corn, bamboo, and coconut hair. In some embodiments, lignocellulosic biomass is selected from the group including, but not limited to, herbaceous material, agricultural residues, forestry residues, municipal solid wastes, waste paper, pulp and paper mill residues, or a combination thereof.

"Lignin" is a polyphenolic material comprised of phenyl propane units linked by ether and carbon-carbon bonds. Lignins can be highly branched and can also be crosslinked. Lignins can have significant structural variation that depends, at least in part, on the plant source involved.

The term "cellulose" refers to a polysaccharide of β-glucose (i.e., β-1,4-glucan) comprising β-(1-4) glycosidic bonds. The term "cellulosic" refers to a composition comprising cellulose.

The term "hemicellulose" can refer polysaccharides comprising mainly sugars or combinations of sugars other than glucose (e.g., xylose). Thus, xylan (polymerized xylose) and mannan (polymerized mannose) are exemplary hemicelluloses. Hemicellulose can be highly branched. Hemicellulose can be chemically bonded to lignin and can further be randomly acetylated, which can reduce enzymatic hydrolysis of the glycosidic bonds in hemicellulose.

The terms "glycosidic bond" and "glycosidic linkage" refer to a linkage between the hemiacetal group of one saccharide unit and the hydroxyl group of another saccharide unit.

As used herein, the term "fiber," refers to an elongated strand of material in which the length to width ratio is greater than about 10, greater than about 25, greater than about 50 or greater than about 100. A fiber typically has a round, or substantially round, cross section. Other cross-sectional shapes for the fiber include, but are not limited to, oval, square, triangular, rectangular, star-shaped, trilobal, pentalobal, octalobal, and flat (i.e., "ribbon" like) shape. The fiber can have any desired diameter, for example, thicker fibers (or "rods) can be chopped or pelletized, while thinner fibers can be used to prepare yarns or fabrics. In some embodiments, the fiber has a diameter of less than about 250 microns, less than about 200 microns, less than about 150 microns, less than about 100 microns, less than about 75 microns, less than about 50 microns, less than about 25 microns, or less than about 10 microns. In some embodiments, the fiber has a thickness of about 1 micron to about 250 microns. In some embodiments, the fiber has a thickness greater than about 250 microns. For example, thicker fibers or rods that can be chopped to provide pellets can have a thickness of a few hundred microns (e.g., about 300 microns, about 400 microns, about 500 microns, or about 750 microns) to a few millimeters (mm) (e.g., about 5 mm, about 10 mm, or about 25 mm). In some embodiments, the thicker fibers or rods can have a diameter of about 1 mm to about 5 mm (e.g., 1 mm, 1.5 mm, 2 mm, 2.5 mm, 3 mm, 3.5 mm, 4 mm, 4.5 mm, or about 5 mm). In some embodiments, the thicker fibers or rods can be chopped into pellets having a length of about 1 mm to about 5 mm (e.g., 1 mm, 1.5 mm, 2 mm, 2.5 mm, 3 mm, 3.5 mm, 4 mm, 4.5 mm, or about 5 mm).

The terms "monofilament fiber" and "monofiber" refer to a continuous strand of material of indefinite (i.e., not pre-determined) length, while the term "staple fiber" refers to a discontinuous strand of material of definite length (i.e., a strand which has been cut or otherwise divided into segments of a predetermined length).

A "melt-spun fiber," as used herein, is a fiber produced by a melt-spinning process. Melt-spinning is a process whereby a melt is extruded through one or more dies, such as one or more die capillaries (e.g., a spinnerette, for example) as molten filaments while simultaneously applying an extensional force which reduces the thickness of the molten filaments. The molten filaments solidify upon cooling below their melt temperature to form fibers. The term "melt spinning" encompasses stable fiber spinning (including short spinning and long spinning) and bulk continuous filament fiber. Melt spun fibers may be cold-drawn.

The terms "melt-compounding" or "compounding" as used here refer to a process of melt blending materials, such as polymers with other additives. Melt-compounding typically involves both heating and mixing materials. In some embodiments, as used herein, the terms "melt-compounding" and "compounding" refer to a method of blending a mixture (e.g., a solids mixture) comprising a lignocellulosic biomass (e.g., ground hemp), a meltable solvent, and a thermoplastic polymer (e.g., a polyester) to provide a homogeneous or more homogeneous blended composition. In some embodiments, compounding further includes extruding the blended composition. Thus, the term "melt-compounding" as used herein can encompass processes such as melt-extruding and melt-spinning. In some embodiments, the terms "melt-compounding" or "compounding" further include any techniques, that involve an apparatus, such as an extruder, capable of melting and mixing a mixture, such as but not limited to additive manufacturing techniques such as 3D printing.

II. REPRESENTATIVE METHODS, COMPOSITIONS, AND SYSTEMS

In some embodiments, the presently disclosed subject matter provides methods and systems for melt-compounding lignocellulosic bio-based thermoplastic materials. In some embodiments, the lignocellulosic bio-based thermoplastic materials can used as thermoplastic feed stocks for use in melt-spinning fibers, extrusion molding, compression molding, blow molding, injection molding, rotational molding, or three-dimensional (3D) printing. In some embodiments, the melt-compounding comprises melt-extruding (i.e., combining melt-compounding of a solids mixture comprising a lignocellulosic biomass, a meltable solvent, and a thermoplastic polymer with extruding a melt of the compounded solids mixture in a predetermined form). Thus, in some embodiments, lignocellulosic biomass material (e.g., ground lignocellulosic biomass), a meltable solvent and a thermoplastic polymer (e.g., a polyester) are melt-extruded in a form such as thick fiber or rod that can be chopped to provide pellets for use in a secondary forming step (e.g., injection molding, compression molding, blow modling, rotational molding, or 3D printing) to provide a desired lignocellulosic biomass-based thermoplastic article. In some embodiments, the melt-compounding comprises melt-spinning to provide a lignocellulosic bio-based thermoplastic fiber.

Figure 5:
FIG. 5 is a digital image of fibers prepared by melt-spinning hemp in the presence of polylactic acid (PLA).
Figure 6:
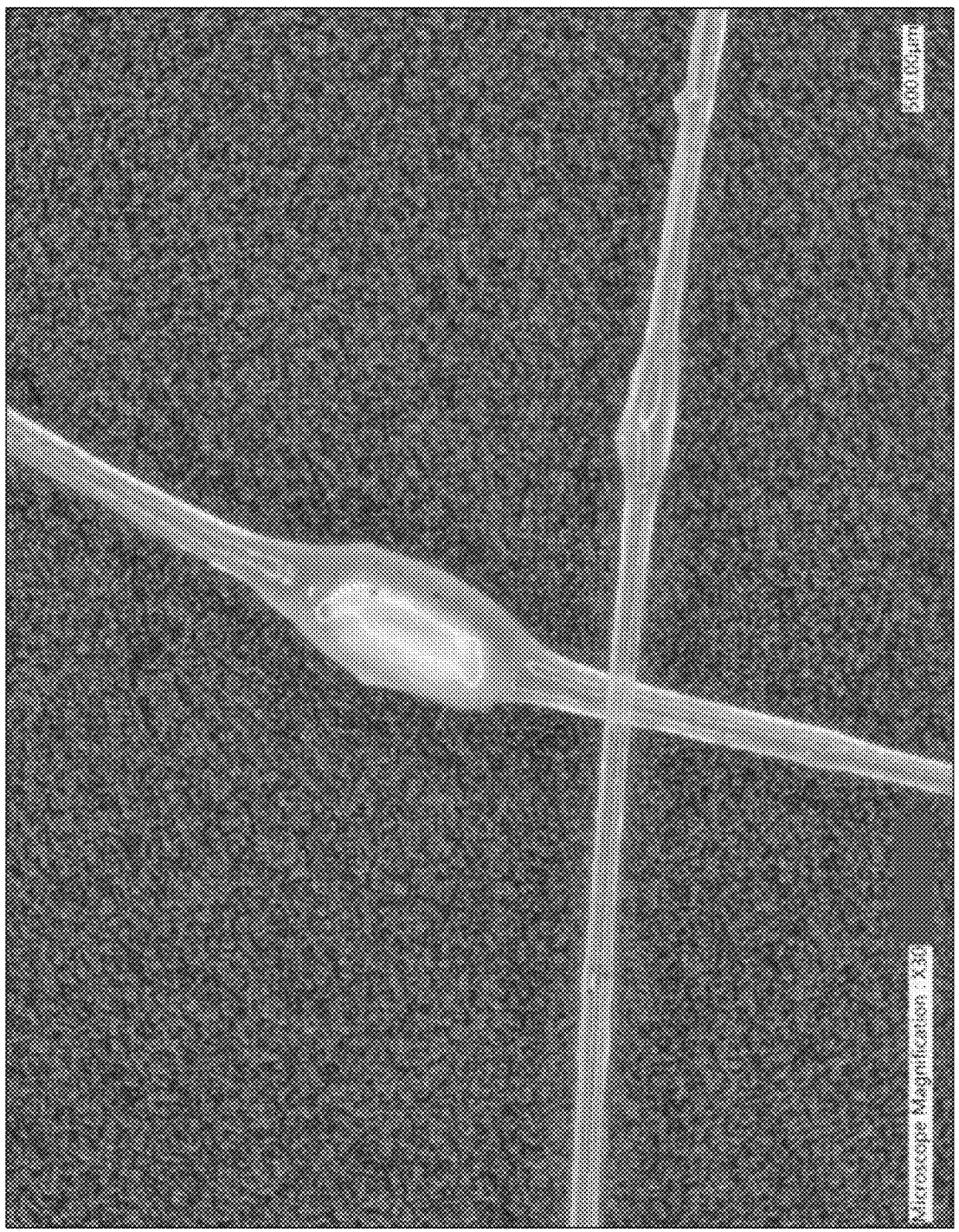
FIG. 6 is a digital image of fibers prepared by melt-spinning hemp in the presence of polylactic acid (PLA).

In some embodiments, the presently disclosed subject matter provides a method of preparing fibers of regenerated cellulose. For example, in some embodiments, the presently disclosed subject matter provides a method of melt-spinning dopes comprising hemp or another lignocellulosic biomass material to provide fibers (e.g., thermoplastic fibers). See FIGS. 5 and 6, which show fibers that were melt-spun from hemp in the presence of PLA using a commercially available extruder and a spooler (sold under the tradename FILABOT® ((Triex, LLC, Barre, Vt.)). Exemplary fibers comprising polylactic acid (PLA) and lignocellulosic biomass derived from hemp (i.e., (PLA)/Hemp at a ratio of 95/5 (w/w) PLA to hemp-based lignocellulosic biomass were melt spun at a temperature of about 170° C. to about 200° C. Fibers comprising PLA, lignocellulosic biomass derived from hemp, and poly ε-captrolactone (PCL) at a ratio of 90/5/5 (w/w) were melt-spun at a temperature of about 170° C. to about 200° C. However, as shown in FIGS. 5 and 6, fibers melt-spun from mixtures comprising biomass and thermoplastic polymer in the absence of a meltable solvent provided non-uniform fibers (e.g., fibers comprising separated lignocellulsic and thermoplastic polymer domains or sections and/or having knobs or thicker and thinner portions of fiber and/or differently colored portions of fiber where separation between the materials occurred). The addition of a meltable solvent to the spinning dope can improve the homogeneity of the spinning dope, resulting in more uniform fibers. In some embodiments, the improved uniformity can provide more flexible fibers compared to fibers comprising the same biomass and thermoplastic polymer components but that were prepared in the absence of the meltable solvent.

In some embodiments, the lignocellulosic biomass material, e.g., hemp powder or powder prepared from another lignocellulosic biomass source can be ground and combined with a meltable solvent (e.g., a compound that is a solid at room temperature, melts below the intended melt-spinning temperature, and in which the hemp or other lignocellulosic biomass-derived powder can be dispersed). The mixture can then be melt-spun to prepare lignocellulosic biomass-based fibers. In some embodiments, a thermoplastic polymer (e.g., a bioplastic or other polyester) can be added to tune physical properties and/or improve processability. For example, the polyester can include a flexible bioplastic polyester with a high strain at break value and/or a linear bioplastic polyester with a tunable rate of biodegradation. In some embodiments, recycled polyethylene terephthalate (PET) can be added as a sustainable fiber precursor.

Thus, in one aspect, the presently disclosed subject matter is based on the use of meltable solvents to dissolve lignocellulosic fibers in hemp (or another lignocellulosic biomass) during melt-compounding. In some embodiments, the lignocellulosic biomass is ground to provide a lignocellulosic powder prior to melt-compounding. As part of the initial melt-compounding process or as a separate process after the initially melt-compounded mixture is cooled, fibers can be spun from the compounded material in mono- or multi-component fiber geometries. In some embodiments, a polyester (e.g. a bioplastic polyester) can be mixed with the hemp (or other lignocellulosic biomass) powder and meltable solvent to provide green bioplastics that are melt-spinnable. In some embodiments, these bioplastics can be pelletized for use in extrusion molding applications, e.g., as engineering plastics, or in other applications employing melts, e.g., 3D printing, compression molding, blow molding, injection molding, or rotational molding.

With particular regard to the use of the presently disclosed methods in providing melt-spun fibers. The presently disclosed methods differ from prior processes of preparing cellulose-based fibers, which typically involve derivatizing cellulose or dissolving cellulose in a flammable solvent that is a liquid at room temperature and solution-spinning fibers. For example, regenerated cellulose fibers are typically prepared by processes involving direct or indirect methods of cellulose dissolution in a room temperature liquid solvent followed by solution-spinning rather than melt-spinning. One example such a process is a direct method involving the use of N-methylmorpholine oxide (NMMO) hydrates in the processing of Lyocell.

Accordingly, in some embodiments, the presently disclosed subject matter provides a method of preparing a lignocellulosic biomass-based (e.g., hemp- or other plant-based) thermoplastic material. In some embodiments, the presently disclosed subject matter provides a method of preparing a lignocellulosic biomass-based (e.g., hemp-based) thermoplastic material wherein the method comprises (1) preparing a mixture of solids comprising lignocellulosic biomass (e.g., a lignocellulosic powder, such as ground lignocellulosic biomass), a meltable solvent, and a thermoplastic polymer; and (b) melt-compounding said mixture of solids, thereby providing a lignocellulosic biomass-based thermoplastic material. In some embodiments, the method comprises: (a) preparing a mixture of solids comprising lignocellulosic biomass (e.g., a lignocellulosic powder, such as ground lignocellulosic biomass), a meltable solvent, and a polyester; and (b) melt-spinning said mixture of solids; thereby preparing a lignocellulosic biomass-based thermoplastic material.

Any suitable lignocellulosic biomass source can be used to provide the lignocellulosic biomass, such as, but not limited to woody and non-woody plants and/or fibers. In some embodiments, the lignocellulosic biomass is prepared from plant source selected from the group including, but not limited to hardwood trees, softwood trees, cotton, flax, kapok, coir, jute, and hemp. In some embodiments, the source of lignocellulosic biomass comprises or consists of hemp. In some embodiments, the lignocellulosic biomass is a hemp powder, e.g., ground hemp. In some embodiments, the lignocellulosic biomass (e.g., the ground hemp) has a particle size of about 500 nm to about 10 microns (e.g., about 500 nm, about 600 nm, about 700 nm, about 800 nm, about 900 nm, about 1 micron, about 2 microns, about 3 microns, about 4, microns, about 5 microns, about 6 microns, about 7 microns, about 8 microns, about 9 microns, or about 10 microns).

The meltable solvent is any suitable compound that is a solid at room temperature, but that melts below temperatures used for melt-compounding, melt-spinning, or melt-extrusion (e.g., temperatures below about 100° C. to about 230° C.) and has a flash point or boiling point above the temperatures used for melt-compounding, melt-spinning, or melt-extrusion. Suitable meltable solvents are also those that are able to mix with the lignocellulosic biomass (e.g., the ground hemp) to provide a homogenous mixture during melt-compounding. Homogeneity can be assessed by observing the mixture (e.g., the melted mixture) by polarized optical microscopy. Under a cross-polarized lens, natural cellulosic fibers are birefrigent and transmit iridescent colors due to their highly crystalline structure. However, dissolved cellulosic fibers are non-crystalline and do not show iridescent colors under a cross-polarized lens. Thus, suitable meltable solvents are also those that can interact with cellulose, lignin, and other extractables typically found in lignocellulosic biomass. Such solvents include, but are not limited to, dimethyl sulfone (DMS-2), which has a melting temperature (Tm) of about 109° C., a boiling temperature (Tb) of 238° C., and a flash point (Tf, which is the lowest temperature where vapor forms at the surface of the substance) of 143° C.; DMS-2 with lithium chloride or zinc chloride (e.g., using about 5% to about 12% chloride salt); choline salts, such as choline acetate (Tm=81° C.; Tf=140° C.), choline isobutyrate (Tm=68° C.), choline isovalerate (Tm=61° C.), and choline 2-methylbutyrate (Tm=90° C.). Room temperature liquid 1-ethyl-3-methyl-imidazolium acetate salt (Tm=−20° C.; Tf=164° C.) has a high flash point that makes it suitable for extrusion. See Elhi et al., Molecules, 2020, 25(7), 1691. In some embodiments, the meltable solvent comprises or consists of DMS-2. The ratio of meltable solvent to thermoplastics can influence the degree of polymer plasticization and the likelihood of solvent at the surface of the extruded lignocellulosic biomass compositions that comprise meltable solvent and polymer.

Any suitable thermoplastic polymer can be used. In some embodiments, the thermoplastic polymer is a polyester. In some embodiments, a bioplastic polyester or mixture thereof can be included as the polyester. In some embodiments, the bioplastic polyester comprises or consists of one or more of the group including, but not limited to, polylactic acid (PLA), polyglycolic acid (PGA), poly ε-captrolactone (PCL), polyhydroxybutyrate (PHB), poly(3-hydroxy valerate), poly(ethylene succinate) (PESu), poly(propylene succinate) (PPSu), polybutylene succinate (PBSu), poly(ethylene furanoate) (PEF), and poly(1-4, butylene adipate). In some embodiments, the bioplastic polyester comprises or consists of PLA. In some embodiments, the bioplastic polyester comprises PLA and PCL. In some embodiments, the PLA, other bioplastic polyester, or mixture thereof has a melt flow index (MFI) at 210° C. measured at a 2.16 kg load of about 6 to about 24 g/10 minutes with processing temperatures from about 180° C. to about 240° C.

In some embodiments, the polyester can comprise or consist of a semi-rigid polyester (e.g., a recycled semi-rigid polyester), such as recycled PET, which can be included due to its green nature. Semi-rigid polyesters suitable for use in the presently disclosed methods and compositions further include, but are not limited to, polybutylene terephthalate (PBT) (e.g., recycled PBT), polytrimethylene terephthalate (PTT) (e.g., recycled (PTT), and polyethylene furanoate (PEF) (e.g., recycled PEF). The semi-rigid polyester can have a MFI at 210° C. measured at a 2.16 kg load of about 6 to about 24 g/10 minutes with processing temperatures from about 180° C. to about 240° C.

Other additives known in the art of melt-compounding, melt-extrusion or melt-spinning, such as, but not limited to, plasticizers, fillers, extenders, slip agents, antioxidants, and colorants, can optionally be included in the solids mixture. In some embodiments, for example, the mixture comprising the lignocellulosic biomass (e.g., ground hemp), meltable solvent, and thermoplastic polymer (e.g., polyester) can further comprise an antioxidant. In some embodiments, the antioxidant is a gallate, such as dodecyl gallate (also known as lauryl gallate), octyl gallate, pentyl gallate, butyl gallate, and propyl gallate. In some embodiments, the antioxidant can be used at a lignocellulosic biomass to antioxidant weight ratio of about 1:0.1 to about 1:0.2. In some embodiments, the solids mixture can comprise polyethylene oxide (PEO) or polypropylene oxide (PPO) polymers. The PEO or PPO can be used at lignocellulosic biomass (e.g. hemp powder) to polymer ratios of about 1:0.1 to about 1:1.

In some embodiments, the mixture of solids comprises a weight ratio of lignocellulosic biomass (e.g., ground hemp) to meltable solvent of about 1:0.1 to about 1:1 (e.g., about 1:0.1, about 1:0.2; about 1:0.3, about 1:0.4; about 1:0.5, about 1:0.6, about 1:0.7, about 1:0.8, about 1:0.9, or about 1:1). In some embodiments, the weight ratio is about 1:1. In some embodiments, the solids mixture comprises a combined amount of lignocellulosic biomass and polyester that comprises about 50% to about 95% by weight of polyester. In some embodiments, the combined amount of lignocellulosic biomass and thermoplastic polymer (e.g., polyester) comprises about 75% to about 95% thermoplastic polymer (e.g., polyester) by weight (e.g., about 75%, 80%, 85%, 90%, or about 95% polyester by weight). In some embodiments, the combined amount of lignocellulosic biomass and thermoplastic polymer (e.g., polyester) comprises about 85% to about 95% thermoplastic polymer (e.g., polyester) by weight (e.g., about 85%, 86%, 87%, 88%, 89%, 90%, 91%, 92%, 93%, 94%, or about 95% polyester by weight). In some embodiments, the combined amount of lignocellulosic biomass and thermoplastic polymer (e.g., polyester) comprises about 90% thermoplastic polymer (e.g., polyester) by weight.

In some embodiments, step (a) comprises: (a1) providing a ground lignocellulosic biomass (e.g., ground hemp of 50 to 250 micrometers); (a2) mixing the ground lignocellulosic biomass with a meltable solvent; and (a3) adding the thermoplastic polymer (e.g., the polyester, such as the bioplastic polyester). In some embodiments, the mixture of solids can be prepared using a mixer or counter-top blender. In some embodiments, the mixture of solids can be prepared using a dynamic or high-speed mixer. In some embodiments, the mixing of the dry (unmelted mixture) can be performed at about 500 rpm or more. In some embodiments, the mixing can be performed for a period of time of about 10 minutes to about 15 minutes. For example, in some embodiments, a dynamic mixer can be used to mix biomass, meltable solvent and thermoplastic polymer pellets and to feed the mixture into a compounding unit (e.g., a single or twin-screw extruder or other commercial compounding apparatus suitable for melt-compounding). When the compounding unit has two hoppers, a mixture of the biomass and meltable solvent can be feed into one hopper and the pellets of thermoplastic polymer (i.e., polyester) into the second hopper.

Melt-compounding can comprise both melting and mixing. In some embodiments, the melt-compounding can be performed using a single or twin-screw extruder. Representative mixing rates during melt-compounding can include, but are not limited to, about 250 rpm to about 500 rpm. In some embodiments, the melting is performed at a temperature of about 120° C. to about 230° C. (e.g., about 120° C., 130° C., 140° C., 150° C., 160° C., 170° C., 180° C., 190° C., 200° C., 210° C., 220° C., or about 230° C.). In some embodiments, the melting is performed at a temperature of about 140° C. to about 180° C. Melt-compounding can be performed for any suitable length of time, e.g., depending upon the time required to provide an extrudate of the melt-compounded material that is continuous and that has a smooth surface. In some embodiments, the melt-compounded material is homogenous (e.g., the cellulosic fibers are dissolved as determined by polarized optical microscopy In some embodiments, the melt-compounding comprises melt-spinning or melt-extruding. Melt-spinning and melt-extruding can be performed using commercially available extrusion and melt-spinning equipment selected, for example, based on the desired configuration of the fibers or extrudate. Representative systems are disclosed elsewhere herein. Thus, the melt-spinning or melt-extruding can be performed by extruding a melt of the mixture of solids using an extruder or spinneret. In some embodiments, the melt-spinning or melt-extruding is performed at a temperature of about 120° C. to about 230° C. (e.g., about 120° C., 130° C., 140° C., 150° C., 160° C., 170° C., 180° C., 190° C., 200° C., 210° C., 220° C., or about 230° C.). In some embodiments, the melt-spinning or melt-extrusion is performed at a temperature of about 170° C. to about 200° C.

Fibers prepared via melt-spinning or melt-extrusion of the mixture of solids can be mono-component or multi-component in configuration. The term "component" as used herein with regard to fibers is defined as a separate part of a fiber that has a spatial relationship to another part of the fiber. Thus, the term "multi-component" as used herein is defined as a fiber having more than one separate part in spatial relationship to one another. The term multi-component includes bi-component, which is a fiber having two separate parts in a spatial relationship to one another. The different components of multi-component fibers can be arranged in substantially distinct regions across the cross-section of the fiber and extend continuously along the length of the fiber. Bi-component and multi-component fibers of the presently disclosed subject matter can be in a side-by-side, sheath-core, segmented pie, ribbon, or islands-in-the-sea configuration, or in any combination thereof. The sheath can be continuous or non-continuous around the core. The fibers of the presently disclosed subject matter can have different cross-sectional geometries that include, but are not limited to, round, elliptical, star shaped, square, trilobal, pentilobal, octalobal, triangular, rectangular, and irregular shapes. In some embodiments, the fiber has a linear density of about 3 to about 50 denier (where denier=grams/9000 meters).

In some embodiments, the method can further include one or more post-processing step. For example, in some embodiments, e.g., when the melt-compounding comprises melt-extrusion or melt-spinning of a fiber, the method further comprises drawing the fiber at an elevated temperature (e.g., about 130° C. to about 240° C. or about 150° C. to about 190° C.) after the fibers exits the extruder or spinneret, e.g., to further orient the fibers.

In some embodiments, the fiber is chopped to provide shorter fibers or pellets. In some embodiments, the method further comprises extrusion molding, injection molding, compression molding, rotational molding, or 3D printing the pellets comprising the lignocellulosic bio-based thermoplastic material to form three-dimensional parts, e.g., rods, panels or articles of any desired 3D shape. For instance, the parts can be of use as car or truck components in the automotive industry, where the use of sustainable and/or low-density raw materials can be attractive.

In some embodiments, the method further comprises removing meltable solvent from the lignocellulosic biomass-based thermoplastic material. Vaporization of the molten solvent from melt-compounded compositions can occur at the flash point and boiling point of the meltable solvent. Tb is preferred for solvent removal since mixtures are compounded to limit the composition of meltable solvent at the surface of lignocellulosic biomass compositions. To remove solvent from fibers while retaining fiber form, fibers can be held under tension at temperatures for vaporations (about or above Tf or Tb). In some embodiments, meltable solvent removal can be performed at temperatures from about 140° C. to 250° C. In some embodiments, meltable solvent removal can be performed by rinsing the material with water, pulling the material (e.g., the fiber) throught a water bath, or soaking the material in a water bath. The bath can also comprise or consist of other polar, water-miscible solvents, e.g., methanol, ethanol, and acetone. In some embodiments, removing the meltable solvent from the material also removes other chemicals, e.g., lignin or pulping chemicals that were present in the lignocellulosic biomass used to prepare the material. In some embodiments, the meltable solvent can be removed from a fabric (e.g., a non-woven fabric) prepared from a fiber of the lignocellulosic biomass-based thermoplastic material using a fabric finishing technique, such as a technique using an immersion bath or pressure vessel at temperatures of about 25° C. to about 80° C.

In some embodiments, it can be desirable to leave the solvent in the material at least for one or more additional post-processing step, e.g., to enhance the ability of the material to be formed or re-formed, e.g., in a 3D printing, extrusion molding, injection molding, compression molding, blow molding or rotational molding process.

In some embodiments, the presently disclosed subject matter provides a lignocellulosic biomass-based (e.g., a hemp-based) thermoplastic composition (e.g., a thermoplastic fiber) prepared by compounding (e.g., melt compounding) a lignocellulosic biomass-based (e.g., hemp-based) powder with a meltable solvent and a thermoplastic polymer (e.g., a polyester such as a bioplastic polyester) and melt-compounding as as described herein. In some embodiments, the melt-compounding comprises melt-extruding. In some embodiments, the melt-extruding comprises melt-spinning a fiber of the thermoplastic composition. The fiber can be continuous or non-continuous. In some embodiments, the fibers can be converted into a yarn. Thus, in some embodiments, the presently disclosed subject matter provides a yarn prepared from lignocellulosic biomass-based (e.g., hemp-based) thermoplastic fibers prepared according to the method of the presently disclosed subject matter. The yarn can be used for fabric manufacturing or making non-woven materials.

In some embodiments, the presently disclosed subject matter provides a composition comprising: (i) lignocellulose (e.g., cellulose); (ii) a thermoplastic polymer (e.g., a polyester); and (iii) a meltable solvent. The meltable solvent can be any solvent that melts above room temperature and below a temperature that can be used for melt-spinning the composition. Thus, in some embodiments, the meltable solvent has a melting temperature of about 40° C. to about 230° C. In some embodiments, the meltable solvent has a melting temperature of about 60° C. to about 180° C. or of about 60° C. to about 120° C. In some embodiments, the meltable solvent include a salt, e.g., LiCl or ZnCl. In some embodiments, the meltable solvent comprises one or more of dimethyl sulfone (DMS-2), DMS-2 and lithium chloride, DMS-2 and zinc chloride, choline acetate, choline isobutyrate, choline isovalerate, choline 2-methylbutyrate, and 1-ethyl-3-methylimidazolium acetate. In some embodiments, the meltable solvent comprises or consists of DMS-2.

In some embodiments, the thermoplastic polymer is a polyester. In some embodiments, the polyester is a bioplastic polyester, such as, but not limited to PLA, PGA, PCL, PHB, poly(3-hydroxy valerate), PESu, PPSu, PBSu, PEF, poly(1-4, butylene adipate) and mixtures thereof. In some embodiments, the bioplastic polyester comprises or consists of PLA. In some embodiments, the polyester comprises a recycled semi-rigid polyester. In some embodiments, the polyester comprises or consists of PET.

In some embodiments, the composition comprises a weight ratio of lignocellulose (e.g., cellulose) to meltable solvent of about 1:0.1 to about 1:1 (e.g., about 1:0.1, 1:0.2, 1:0.3, 1:0.4, 1:0.5, 1:0.6, 1:0.7, 1:0.8, 1:0.9, or about 1:1). In some embodiments, the ratio is about 1:1. In some embodiments, the weight ratio of polyester to lignocellulose (e.g., cellulose) is about 1:1 to about 9:1 (e.g., about 1:1, 2:1, 3:1, 4:1, 5:1, 6:1, 7:1, 8:1, or about 9:1). In some embodiments, the composition further comprises an antioxidant. In some embodiments, the antioxidant is a gallate. In some embodiments, the antioxidant is lauryl gallate. In some embodiments, the weight ratio of antioxidant to meltable solvent is about 0.1:1.

The lignocellulose can be obtained from any suitable source, such as, but not limited to woody and non-woody plants and/or fibers. In some embodiments, the lignocellulosic biomass is prepared from plant source selected from the group including, but not limited to hardwood trees, softwood trees, cotton, flax, kapok, coir, jute, and hemp. In some embodiments, the source of the lignocellulose comprises or consists of hemp.

In some embodiments, the presently disclosed subject matter provides an article comprising a composition comprising: (i) lignocellulose (e.g., cellulose); (ii) a thermoplastic polymer (e.g., a polyester); and (iii) a meltable solvent. In some embodiments, the article is a fiber, yarn, or a fabric. In some embodiments, the article is a three-dimensional article prepared by injection molding, extrusion molding, blow molding, compression molding, rotational molding, or 3D printing. In some embodiment, the article is a pellet, e.g., that can be used in secondary shaping applications, e.g., melt-spinning, 3D printing, extrusion molding, injection molding, blow molding, compression molding, or rotational molding.

Figure 2:
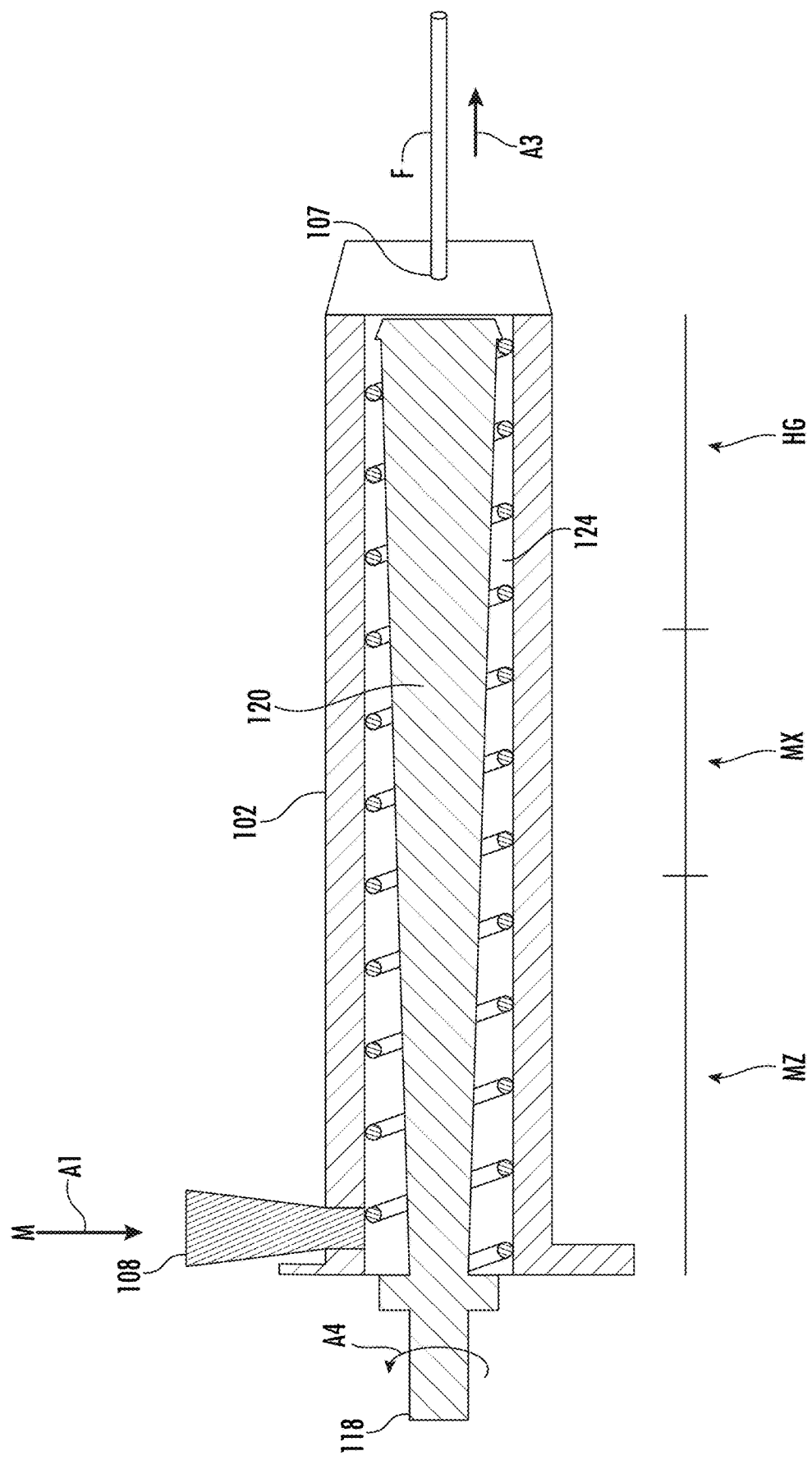
FIG. 2 is a schematic cut away side view of a single screw extruder in accordance with the presently disclosed subject matter suitable for use in a method of the presently disclosed subject matter.
Figure 3:
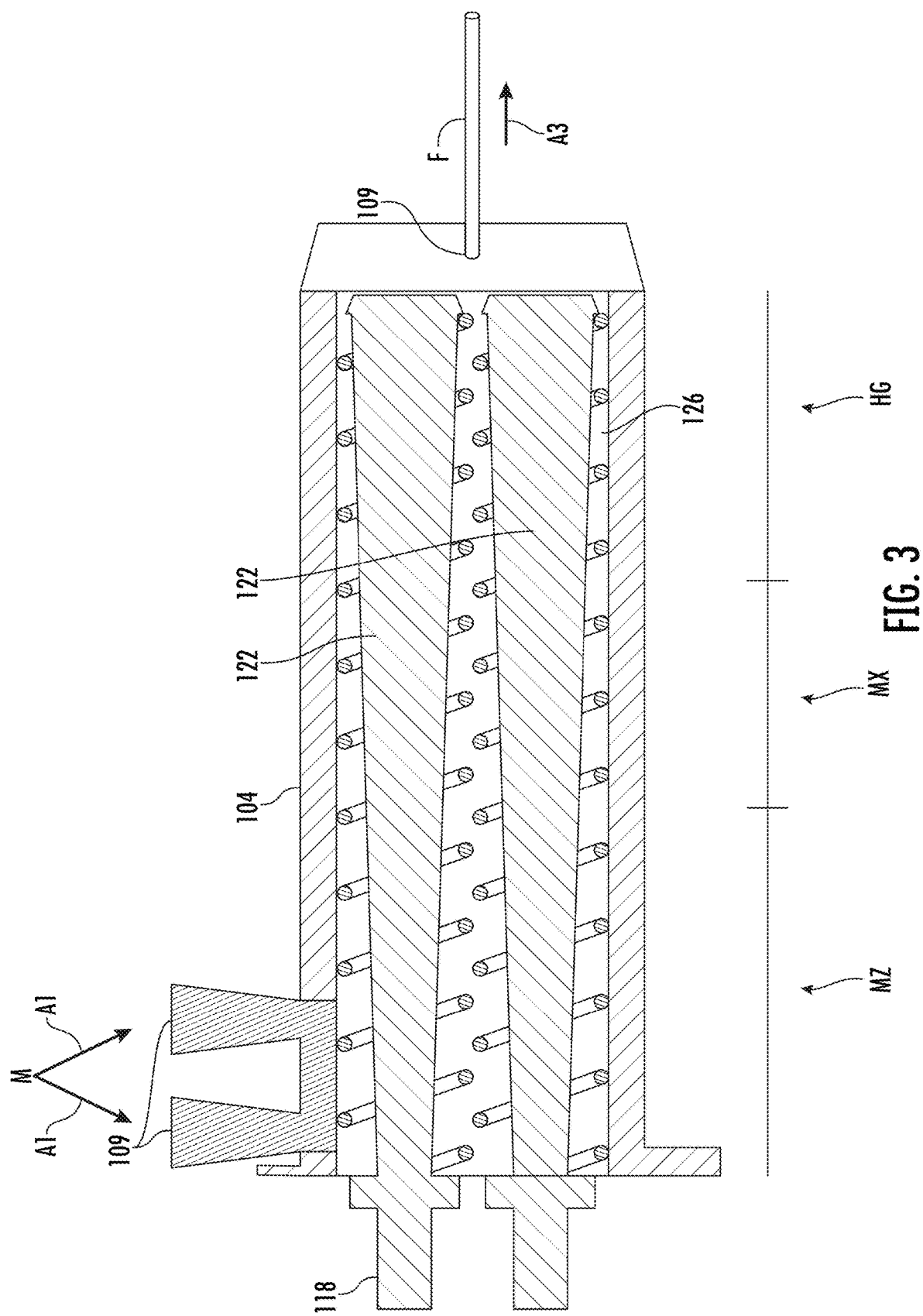
FIG. 3 is a schematic cut away side view of a twin-screw extruder in accordance with the presently disclosed subject matter suitable for use in a method of the presently disclosed subject matter.

Referring now to FIGS. 1-3, a system in accordance with the presently disclosed subject matter, which is suitable to carry out a method of the presently disclosed subject matter is referred to generally at 100. System 100 comprises an extruder 102, which by way of non-limiting example can be a single-screw extruder as described in FIGS. 1 and 2, or can be a twin-screw extruder 104 as shown in FIG. 3. Extruder 102 and 104 each further comprise a hopper 108 (which can be a double hopper 109 as shown in FIG. 3) and a mixture M in accordance with the presently disclosed subject matter (e.g., a mixture of lignocellulosic biomass, meltable solvent, and polymer (e.g., polyester)) can be fed into hopper 108 or double hopper 109 in the direction of arrow A1. An airpath device 110 follows extruder 102 in line and a filament F extruded from outlet 107 of extruder 102 travels over airpath device in the direction of arrow A2. Air path device 110 can be used to help solidify the filament, e.g., in embodiments where it is not desirable to remove the meltable solvent. Examples of the extruder and the airpath are commercially available from under the tradename FILABOT® (Triex, LLC, Barre, Vt.). The filament F is wound on take-up roller 112. A representative example of a take-up roller 112 is also commercially available under the tradename Filabot Spooler: Precision Filament Winder. In some embodiments, filament F is drawn across air path 110 and and taken upon by motorized reels 114 and 116 and collected on a spool 118 of take-up roller 112. The speed of the take-up roller is adjusted to tune the diameter of collected filament. As the take-up speed for continuous filament increases, filament diameter decreases.

Continuing with reference to FIGS. 2-3, a motor 118 is shown, which drives the single screw 120 of extruder 102 for rotation in the direction of arrow A4 or drives the double screws 122 of extruder 104 rotationally. Extruders 102 and 104 are configured to provide zones that are operable to melt, mix, and provide homogenization to the mixture M so that a filament F can be extruded in the direction of arrow A3. In some embodiments, melting zone MZ, mixing zone MX, and homogenization zone HG occur sequentially beginning from motor 118 and proceeding towards outlet 107 or extruder 102 (FIG. 2) or outlet 109 of extruder 104 (FIG. 3). Homogenization can be improved by the number of zones or the number of passes through the extruder. Homogenization is indicated by extrusion of a smooth rod of extrudate from the extruder. For instance, 2-3 passes through the extruder can be used for homogenization, but, in some embodiments pellets can be sufficient homogenized after 1 pass through an extruder in the form of a Barbender compounder, having 4 zones, but additional passes can be considered. The temperature may gradually increase with each zone. Zone 1 at 140, zone 2 at 160 and the zone 3 and 4 of an extruder in the form of a Barbender compounder are at temperatures of 180° C.; +/−15° C. for each zone. Similar zone temperatures can be used for melt spinning, but around +10° C. for each respective zone temperature. That is, mixture M is driven through the internal space 124 of extruder 102 or the internal space 126 of extruder 104 by screw 120 or screws 122, respectively, to produce a filament F from outlets 107 or 109, respectively. Non-limiting, representative temperature ranges, mixing rates, and other parameters are disclosed elsewhere herein.

Figure 4:
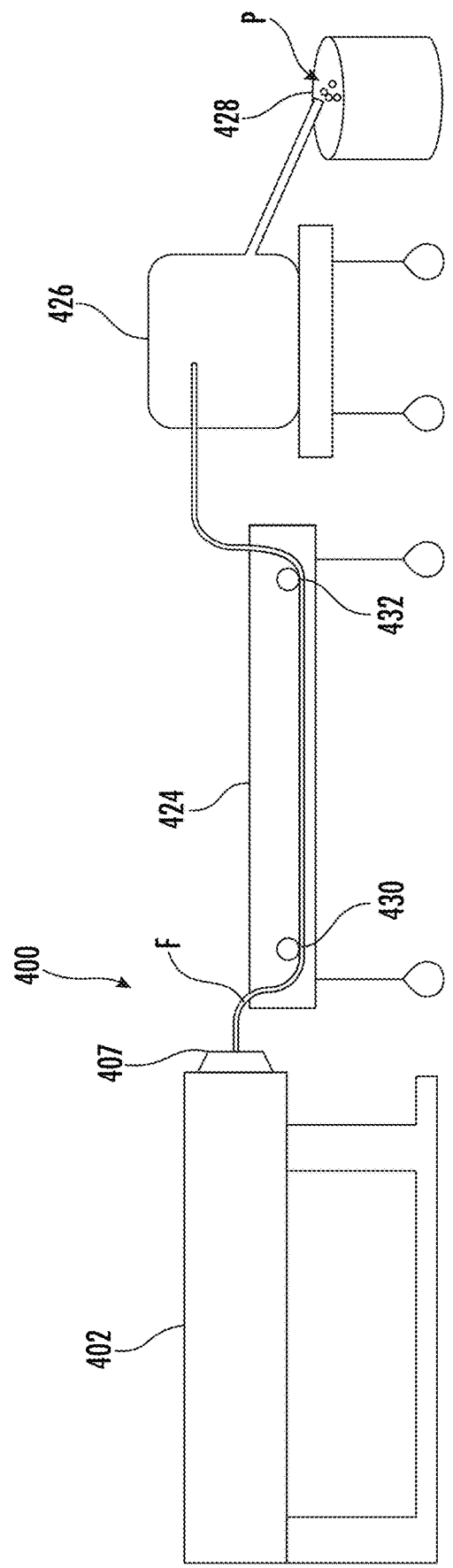
FIG. 4 is a schematic side view of a system of the presently disclosed subject matter suitable for use in a method of the presently disclosed subject matter.

Referring to FIG. 4, an alternative configuration of a system of the presently disclosed subject is show generally at 400. Extruder 402, which can comprise a single screw, twin screw, or other screw configuration, produces a filament F in manner similar to the system as described in FIGS. 1-3, except that filament F is generally thicker in diameter than filament F in FIGS. 1-3. Filament F is drawn through a wash bath 424 via rollers 430 and 432 for a desired treatment, such as to remove molten solvent. Rollers 430 and 432 can keep filament F under tension while the molten solvent is removed so that filament F can retain its shape during the removal, even if the non-solvent components (e.g., the lignocellulosic material) soften in the bath. In some embodiments, filament F after exposure to wash bath 424 is directed to a pelletizer 426 which forms pellets P from filament F and the pellets P are collected in a collector 428. As disclosed herein above, pellets P can be used, for example, as engineering plastics.

It is further noted that pelletizer 426 and collector 428 can also be implemented with an extruder and air gap as shown in FIG. 1, as yet a further embodiment. Indeed, any configuration of system components as would be apparent to one of ordinary skill in the art upon a review of the present disclosure is provided herein and falls with scope of the presently disclosed subject matter.

As noted above, the air path in FIG. 1 serves to help solidify the filament. Thus, in some embodiments, the air path can be used where it is not necessarily desired to remove the meltable solvent. Also, solvent baths, as described herein, can be used to solidify the filament but in some cases, can remove solvent prematurely. Here as well, an embodiment employing an air bath, such as prior to exposing the filament to the solvent bath, can be implemented.

Additional examples of commercially available equipment that can be employed in accordance with the presently disclosed subject matter include a Brabender compounder (C.W. Brabender Instruments, Inc., South Hackensack, N.J., United States of America) or a LIST knead reactor (LIST Technology AG, Anisdorf, Switzerland) (which can be employed for pelletization of a hemp/meltable solvent/polyester mixture), Hills melt extrusion screw extruders (Hills Inc., West Melbourne, Fla., United States of America) (which can process pellets into fibers), and Engel Injection Molding Machinery (Engel Machinery Inc., USA (York, Pa., United States of America). In some embodiments, additive manufacturing techniques and equipment can be employed in the methods of the presently disclosed subject matter such as those from 3D Systems (Rock Hill, S.C., United States of America) for 3D printers for additive manufacturing.

III. EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Dissolution Test

A Dissolution Test was performed to evaluate suitable ratios of biomass to meltable solvent to provide dissolution. Dissolution times used in the dissolution tests do not directly translate to time needed to provide a homogenous mixture when performing melt-compounding using a single-, twin-screw extruder, or knead reactors as these can provide for homogenization at a faster rate.

The following recipe and mixing parameters were employed.

Recipe 1:
Ratios: DMS-2:LiCl:Hemp:LGa=20:1.6:1:0.2
Amounts:
DMSO2=20 g; Hemp Fiber=1 g; LiCl=1.6 g; Lauryl Gallate (LGa)=0.2 g
Temperature=140-150° C.
Stirrer=250 rpm The solids were mixed and heated using a reaction flask. Heating was performed overnight.

Figure 7A:
FIGS. 7A and 7B are digital images of a dissolution prepared in accordance with a method of the presently disclosed subject matter as described in Example 1.
Figure 7B:
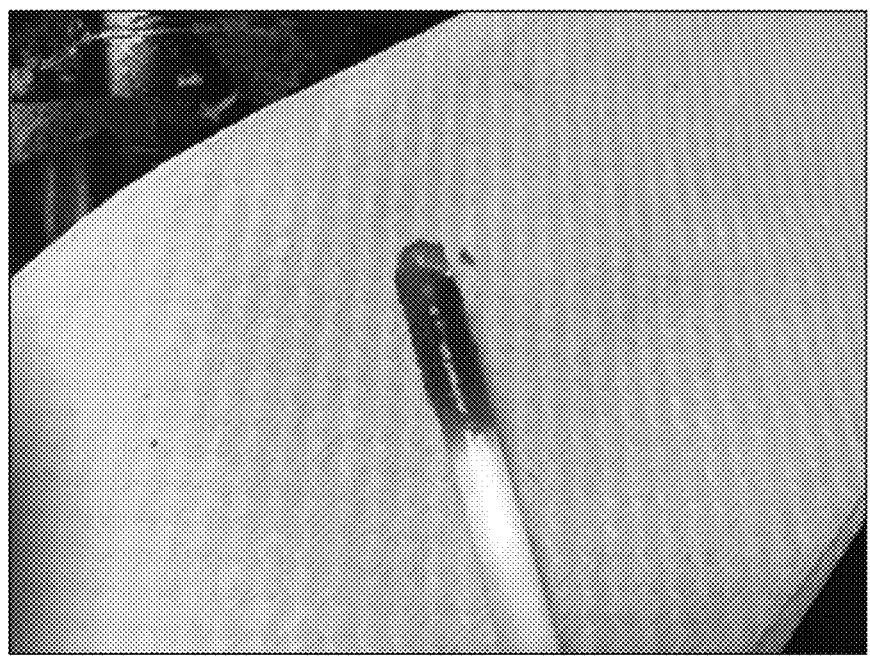
Figure 8:
FIG. 8 is a digital image of a dissolution prepared in accordance with a method of the presently disclosed subject matter as described in Example 1.

Result: Fibers initially swell, then disintegrate and finally dissolve. A homogeneous mixture of Hemp/DMS-2/LiCl/LGa was observed. See FIGS. 7A, 7B, and 8. Based on optical imaging using cross-polarized light, complete dissolution was observed (no crystalline regions or phase separation).

Example 2

Melt-Spinning

Figure 9A:
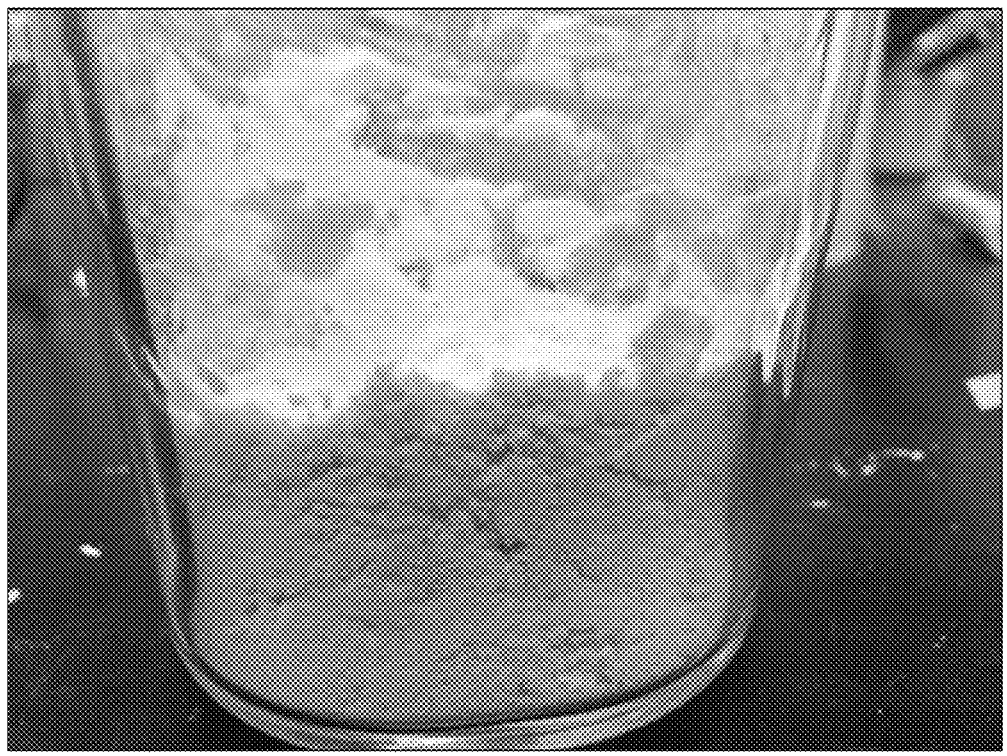
FIGS. 9A and 9B are digital images, respectively, of a powder blend and fibers prepared in accordance with a method of the presently disclosed subject matter as described in Example 2.

In this Example, a Melt-Spinning Test was performed using a system substantially as shown herein above in FIGS. 1-4. The following recipe was used to form a powder as shown in FIG. 9A. The following parameters were employed.

Recipe 1 plus PLA
DMS-2:LiCl:Hemp:LGa=20:1.6:1:0.2
DMS-2=20 g; Hemp Fiber=1.5 g; LiCl=1.6 g; Lauryl Galate (LGa)=0.2 g; PLA=6 g.

Melt-extrusion was performed at 160-180° C. During extrusion, the extruder rate was set to the slowest rate that provided a steady steam of extrudate.

Figure 9B:

Result: Hemp/PLA blend fibers were obtained as soft, flexible, thin fibers. See FIG. 9B.

Example 3

Melt-Spinning

Figure 10A:
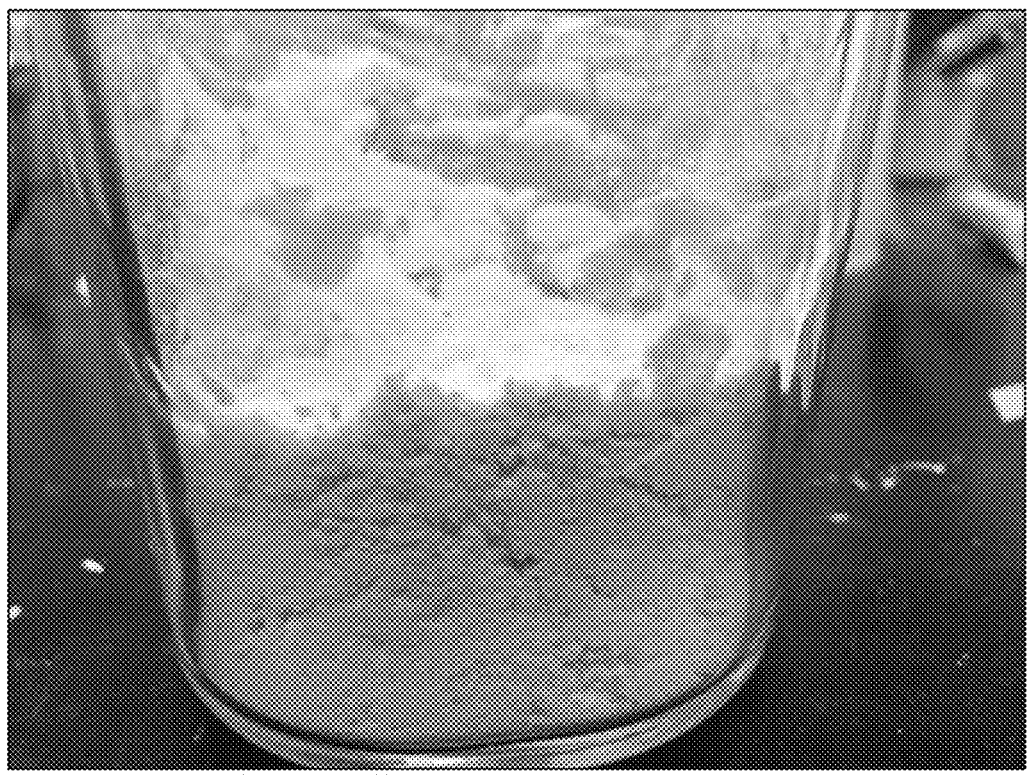
FIGS. 10A and 10B are digital images, respectively, of a powder blend and fibers prepared in accordance with a method of the presently disclosed subject matter in Example 3.

In this Example, a Melt-Spinning Test was performed using a system substantially as shown herein above in FIGS. 1-4. The following recipe was used to form a powder blend as shown in FIG. 10A.

Figure 10B:
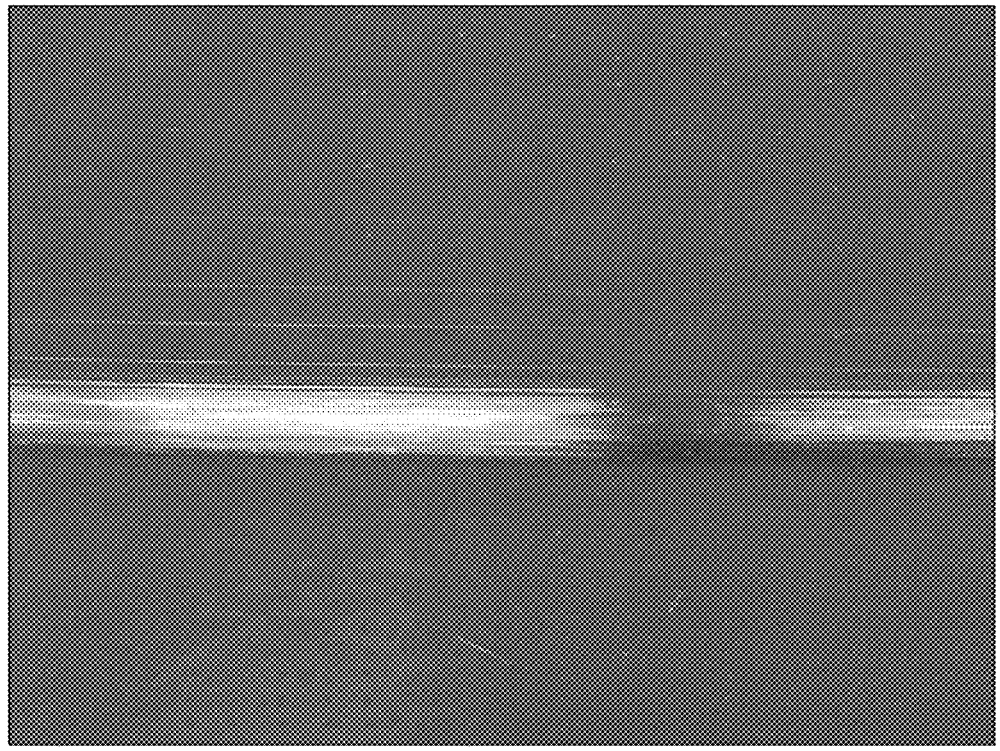

Recipe 2
Ratios: DMS-2:LiCl:Hemp:LGa:PLA=20:1.6:1.5:0.2:6
Amounts:
DMS-2=20 g; Hemp Fiber=2 g; LiCl=1.6 g; Lauryl Galate (LGa)=0.2 g; PLA=6 g.
Extrusion Conditions:
Temperature: 180° C.
Feed Speed: Medium
Take-up: 40 rpm Result: Hemp/PLA blend fibers were obtained as soft, flexible, thin fibers. See FIG. 10B.

All references cited in the instant disclosure, including but not limited to all patents, patent applications and publications thereof, scientific journal articles, and database entries (e.g., GENBANK® database entries and all annotations available therein) are incorporated herein by reference in their entireties to the extent that they supplement, explain, provide a background for, or teach methodology, techniques, and/or compositions employed herein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method of preparing a lignocellulosic biomass-based thermoplastic composition, wherein the method comprises:
   (a) providing a mixture of solids comprising lignocellulosic biomass, a meltable solvent and a polyester; and
   (b) melt-compounding said mixture of solids; thereby preparing a lignocellulosic biomass-based thermoplastic composition;
   wherein the meltable solvent comprises a compound that is a solid at room temperature, that melts at a temperature below a temperature used for the melt-compounding of step (b), and that has a flash point or boiling point at a temperature above the temperature used for the melt-compounding of step (b).

2. The method of claim 1, wherein the lignocellulosic biomass comprises hemp.

3. The method of claim 1, wherein the meltable solvent comprises one or more of dimethyl sulfone (DMSO-2), choline acetate, choline isobutyrate, choline isovalerate, and choline 2-methylbutyrate.

4. The method of claim 1, wherein the polyester comprises a bioplastic polyester.

5. The method of claim 4, wherein the bioplastic polyester comprises or consists of PLA.

6. The method of claim 1, wherein the polyester comprises a recycled semi-rigid polyester.

7. The method of claim 1, wherein the mixture of solids comprises a weight ratio of lignocellulosic biomass to meltable solvent of about 1:0.1 to about 1:1.

8. The method of claim 1, wherein step (a) comprises:
   (a1) providing a ground lignocellulosic biomass;
   (a2) contacting the ground lignocellulosic biomass with the meltable solvent; and
   (a3) adding the polyester.

9. A method of preparing a lignocellulosic biomass-based thermoplastic composition, wherein the method comprises:
   (a) providing a mixture of solids comprising lignocellulosic biomass, a meltable solvent and a polyester; and
   (b) melt-compounding said mixture of solids, wherein the melt-compounding is performed at a temperature of about 170 degrees Celsius (° C.) to about 200° C. thereby preparing a lignocellulosic biomass-based thermoplastic composition.

10. The method of claim 1, wherein the melt-compounding comprises melt-spinning or melt-extruding to provide a lignocellulosic biomass-based fiber.

11. The method of claim 10, wherein the method further comprises chopping the fiber.

12. The method of claim 1, wherein the method further comprises removing meltable solvent from the lignocellulosic biomass-based thermoplastic composition.

13. The method of claim 1, wherein the meltable solvent further comprises a salt.

14. The method of claim 13, wherein the salt is lithium chloride or zinc chloride.

15. The method of claim 14, wherein the meltable solvent comprises DMSO-2 and about 5% to about 12% of the salt.

16. The method of claim 2, wherein the lignocellulosic biomass comprises ground hemp.

17. The method of claim 3, wherein the meltable solvent comprises or consists of DMSO-2.

18. The method of claim 4, wherein the bioplastic polyester comprises one or more polyester selected from the group consisting of polylactic acid (PLA), polyglycolic acid (PGA), poly ε-captrolactone (PCL), polyhydroxybutyrate (PHB), poly(3-hydroxy valerate), poly(ethylene succinate) (PESu), poly(propylene succinate) (PPSu), polybutylene succinate (PBSu), poly(ethylene furanoate) (PEF) and poly (1-4, butylene adipate).

19. The method of claim 6, wherein the recycled semi-rigid polyester is recycled polyethylene terephthalate (PET).

20. The method of claim 7, wherein the mixture of solids comprises a weight ratio of lignocellulosic biomass to meltable solvent of about 1:1.

21. The method of claim 10, wherein the method further comprises drawing the lignocellulosic biomass-based fiber at an elevated temperature after the melt-spinning or melt-extruding.

22. The method of claim 21, wherein the elevated temperature is about 130° C. to about 240° C.

\* \* \* \* \*